United States Patent [19]

Creswick

[11] Patent Number: 4,931,788
[45] Date of Patent: Jun. 5, 1990

[54] TRANSPONDER AND INTERROGATOR

[75] Inventor: M. Martin Creswick, Blackwell Heath, England

[73] Assignee: Meridian Micro-Systems Ltd., London, England

[21] Appl. No.: 127,939

[22] Filed: Dec. 2, 1987

[30] Foreign Application Priority Data

Dec. 5, 1986 [GB] United Kingdom ............... 8629170
Dec. 9, 1986 [GB] United Kingdom ............... 8629383
Dec. 9, 1986 [GB] United Kingdom ............... 8629384

[51] Int. Cl.$^5$ .............................................. H04Q 1/00
[52] U.S. Cl. ......................... 340/825.54; 340/825.69; 340/825.72
[58] Field of Search ............... 340/825.54, 505, 572, 340/825.3, 825.31, 825.34, 825.69, 825.72; 370/100, 102; 375/120; 342/42, 44, 51

[56] References Cited

U.S. PATENT DOCUMENTS

| | | |
|---|---|---|
| 3,798,642 | 3/1974 | Augenblick et al. ................ 342/42 |
| 4,370,653 | 1/1983 | Crowley ................................ 342/42 |
| 4,388,524 | 6/1983 | Walton ........................... 340/825.31 |
| 4,399,437 | 8/1983 | Falck et al. ..................... 340/825.54 |
| 4,631,708 | 12/1984 | Wood et al. .................... 340/825.54 |
| 4,642,573 | 2/1987 | Noda et al. ......................... 370/100 |
| 4,654,658 | 3/1987 | Walton ........................... 340/825.54 |
| 4,730,188 | 9/1988 | Milhuser ........................ 340/825.69 |

OTHER PUBLICATIONS

Lathi, B. P., "Modern Digital and Analog Communications Systems", 1983 section 4.12, p. 285.

Primary Examiner—Donald J. Yusko
Assistant Examiner—Eric Oliver Pudpud
Attorney, Agent, or Firm—Price, Heneveld, Cooper, DeWitt & Litton

[57] ABSTRACT

A transponder, comprising means for receiving a periodically modulated interrogating signal; means for demodulating the received signal to produce a periodic baseband signal; and means for transmitting data at a rate determined by the periodicity of the baseband signal.

23 Claims, 9 Drawing Sheets

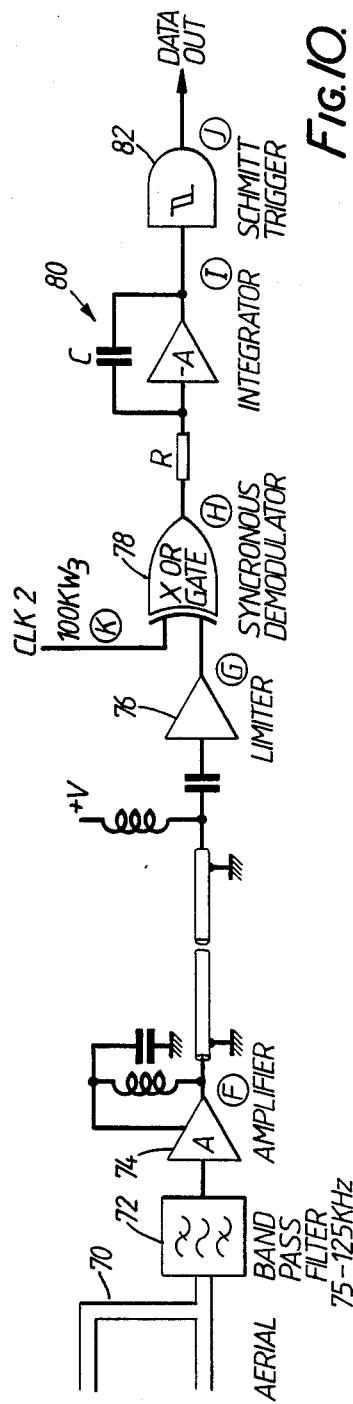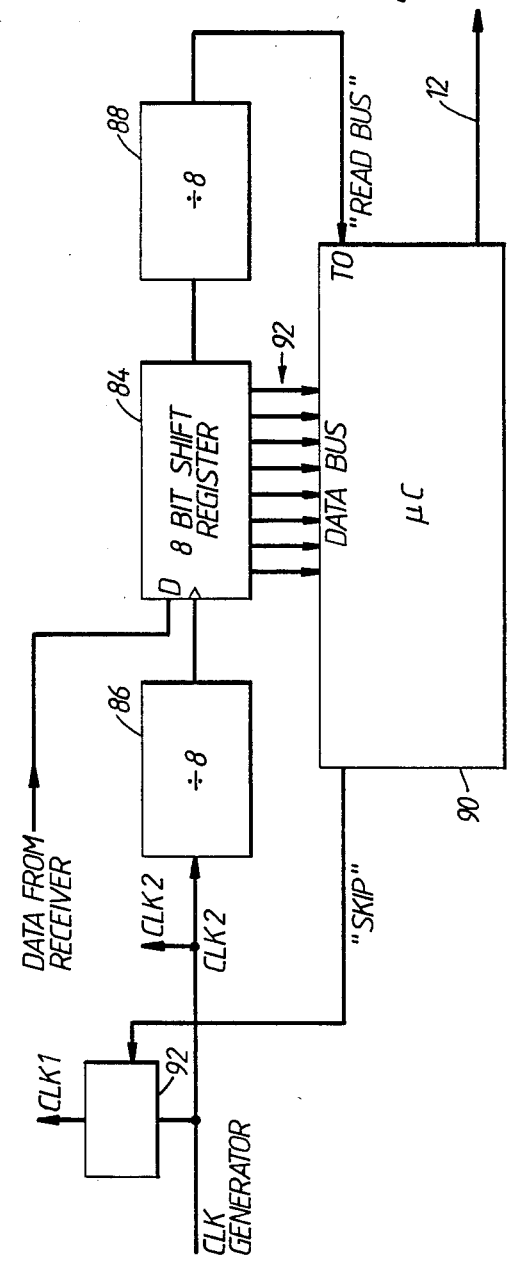

4,931,788

TRANSPONDER AND INTERROGATOR

FIELD OF THE INVENTION

This invention relates to transponders and to interrogators thereof.

BACKGROUND OF THE INVENTION

Transponders are used to return a signal on receipt of an interrogating signal. The returned signal can be used merely to indicate that the transponder is present, or can be used to convey further information such as the particular identity of the transponder. A miniature form of such a transponder, sometimes called a tag, can be used to identify goods for security or stock control in say a store, people for security purposes, animals, (e.g. cattle) to ensure positive identification for feeding, treatment, control of disease, pedigree purposes, and so on. The transponder could return other information besides its identity, and could be used to gather information from, say, sensors for returning.

(1) When the information is in the form of digital data, the transmitter requires a clock signal in order to define the bit intervals in the transmitted data. If the data is transmitted synchronously, both the transmitter (in the transponder) and the receiver (in the interrogator) require common clocking information. This could be generated in either the transponder or the interrogator, and transmitted to the other. It is convenient to generate the clocking information in the interrogator, since this simplifies the transponder. The clocking information then requires transmitting to the transponder, but is immediately available for the receiver of the interrogator. Even in the possible alternative of asynchronous transmission from the transponder to the interrogator, it would simplify the transponder if the clocking information is transmitted from the interrogator.

In one prior proposal which uses synchronous data transmission, the clock signal in the transponder is derived by dividing the frequency of the interrogate signal carrier. This has the disadvantage however, that the data rate and the interrogate signal frequency are permanently related. If therefore it were desired in, say, an unusually noisy environment, to reduce the data rate to reduce errors, that would be impossible because the resulting change of frequency in the interrogate signal would prevent it being accepted by the transponder, without retuning the transponder's receiver. That would normally mean redesigning the receiver.

(2) When the information is in the form of digital data, there is a problem of synchronising the interrogator to receive the data in the returned signal. One way to arrange the interrogator to receive data at the right rate, is to transmit clocking information to the transponder in the interrogating signal. The transponder then uses the clocking information to control the data transmission rate.

This, however, still leaves the problem of finding the start of the data. The problem is particularly important if the signal returned by the transponder is in the form of a signal such as a phase shift keying (PSK) signal, in which it is necessary to find the start of a bit in the data.

(3) When the information is in the form of digital data, the signal returned is in the form of a carrier modulated with the information. Naturally, prior art transponders include a modulator for modulating the carrier with stored information.

It is always advantageous to simplify and to reduce costs. However, in the case of a transponder which may be incorporated in, say, an animal's ear tag, reduction of costs and weight have particular relevance.

SUMMARY OF THE INVENTION

The problem (1) above is overcome by the invention which in broad aspect provides data clocking information modulated on the interrogating signal.

A transponder in accordance with the invention comprises:
  means for receiving a periodically modulated interrogating signal;
  means for demodulating the received signal to produce a periodic baseband signal; and
  means for transmitting data at a rate determined by the periodicity of the baseband signal.

By altering the periodicity of the signal modulating the interrogate signal, the data rate can be altered independently of the carrier frequency.

The interrogating signal preferably has a periodic envelope, the means for demodulating comprising means for detecting the envelope of the received signal to produce the periodic baseband signal.

The means for transmitting data preferably comprises:
  means for providing a carrier modulated by said data, the carrier having a frequency also determined by the periodicity of the baseband signal.

Apparatus for interrogating a transponder in accordance with the invention, comprises:
  means responsive to a periodic reference signal, for transmitting a periodically modulated interrogating signal, the periodicity of said modulation being determined by the periodicity of the reference signal and
  means for receiving a signal transmitted by the transponder as a result of the interrogating signal, to recover the data.

Although a transponder and interrogator in accordance with the invention have clear advantages, certain problems are raised with regard to the modulated interrogating signal. In contrast to the prior art arrangement described above, the modulated interrogating signal must have a significant bandwidth. Radio frequency spectrum (in particular) is always at a premium. The problem therefore, is to provide the interrogating signal in a form which has minimum bandwidth but which can be demodulated easily and inexpensively in the transponder.

To ease demodulation, the interrogating signal preferably has a periodic envelope.

The band width of the interrogating signal is minimal in the preferred arrangement in which the means for transmitting an interrogating signal comprises:
  means for generating a signal comprising the sum of two sinusoids having frequencies differing by an amount determined by the periodicity of the reference signal.

The spectrum of the preferred interrogating signal thus comprises two isolated single frequencies.

In one embodiment of the invention the means for generating comprises:
  a fixed frequency oscillator;
  a variable frequency oscillator;
  means for summing the outputs of the oscillators;
  means for detecting the amplitude variations in the summed outputs to produce a baseband signal; and a phase detector for detecting differences in phase between the baseband signal and the reference signal, to control the frequency of the variable frequency oscillator to reduce such phase differences.

In another embodiment of the invention the means for transmitting comprises:

an oscillator and a balanced modulator arranged to modulate the oscillator output with a modulating signal input from the reference signal, so as to produce an output signal having two frequency components differing by twice the frequency of the modulating signal input.

To deal with the problem (2) above the data to be transmitted is given a start code. If the interrogator cannot identify the start code in a block of received data, the phase of the transmitted clocking information and the phase of a periodic reference signal which controls demodulation of the signal received from the transponder, are shifted relative to one another.

In accordance with the invention there is provided apparatus for interrogating a transponder which is operative to derive a clock signal from an interrogating signal and to repetitively transmit a block of data containing a start code at a data rate controlled by said clock signal, the apparatus comprising:

means for generating first and second periodic reference signals, the phase of one reference signal being adjustable relative to the phase of the other;

means for transmitting an interrogating signal having a phase determined by the phase of the first reference signal;

means for receiving a modulated signal transmitted by the transponder as a result of the interrogating signal;

means responsive to the phase of the second reference signal to demodulate the received signal to recover the data;

means for identifying the start code in the demodulated signal; and means responsive to the start code not being identified in a block of the demodulated signal of equivalent length to a block of data, to cause a relative shift in phase between the first and second reference signals.

In one embodiment the means to cause a phase shift is arranged to cause a phase shift in the interrogate signal. Alternatively, the means to cause a phase shift may be arranged to cause a phase shift in the reference signal.

In a preferred embodiment in which the means to demodulate the received signal comprises means responsive to the second reference signal to sample the received signal periodically, the means to cause a phase shift comprises means to cause the second reference signal to skip or stuff a pulse relative to the first.

The apparatus preferably includes means for storing the block of demodulated signal, the means for identifying the start code being arranged to identify the start code in the stored block.

To deal with the problem (3) above, the invention comprises storing data in the format of a modulated signal.

A transponder in accordance with the invention comprises:

means for receiving an interrogating signal;
means responsive to receipt of the interrogating signal to generate a clock signal;
means for storing data in the format of a modulated signal, and responsive to the clock signal to read the data; and
means for transmitting the data serially and direct, without modulating a carrier.

The invention thus avoids the use of a modulator, reducing the complexity, weight and cost of a transponder, at the expense of extra storage to enable the data to be stored in the format of a modulated signal. Depending on the amount of information it is required to return, it may be that in practice the extra storage is already available. In any event it is expected that the advantages would normally outweigh the disadvantage A further advantage, is that both the data rate and the carrier frequency have a degree of independence from the clock rate. The clock rate may for example be derived from the interrogating signal.

Consider a preferred embodiment, in which the data is stored in the format of a phase shift keying (PSK) signal. If data state ONE is stored as 01 and data state ZERO is stored 10, the data rate is twice as high as if the state ONE is stored as 0101 and state ZERO as 1010. In the latter case the carrier frequency is twice as high as would be the case if state ONE were stored as 0011 and state ZERO were stored as 1100, although the data rate is the same.

BRIEF DESCRIPTION OF THE DRAWINGS

Preferred embodiments of the invention, given by way of example only, will now be described with reference to the accompanying drawings, in which:

FIG. 10 shows a receiver circuit for the interrogator of FIG. 1; and

FIG. 11 shows a controller for the interrogator of FIG. 1.

DETAILED DESCRIPTION

Figure 1:
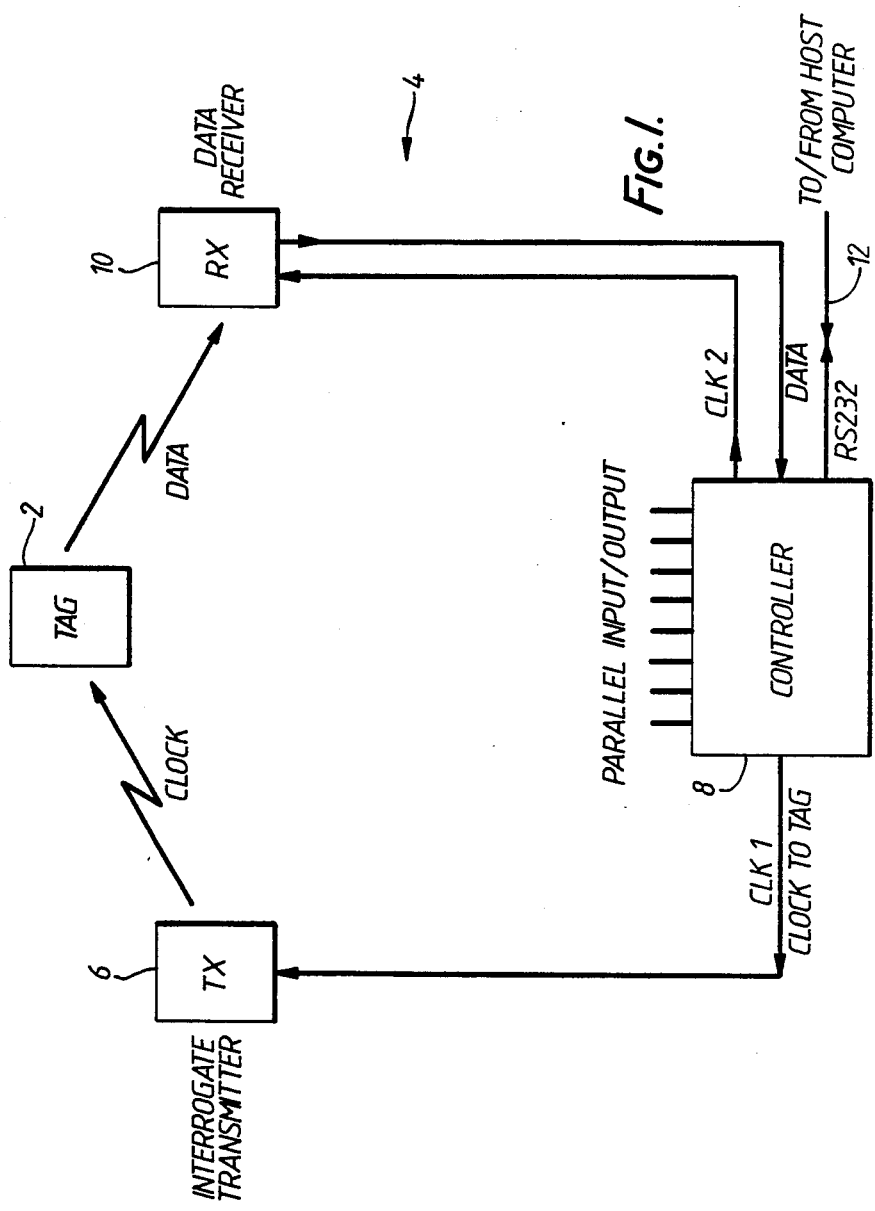
FIG. 1 shows the general scheme of a transponder and interrogator.

FIG. 1 shows a transponder 2 and an interrogator 4. The transponder 2 can be of a size and form that the term "tag" is appropriate. The transponder may be used to identify goods for security or stock control in, say a store, people for security purposes, animals (e.g. cattle) to ensure positive identification for feeding, treatment, control of disease pedigree purposes, and so on. In the form of a tag for animals, say, the transponder is mobile and the transponder less mobile, perhaps fixed.

The transponder may be powered by an interrogating signal or, as in the present embodiment, may be powered by a miniature 3 v lithium hydroxide cell. In any event, to prevent the transponder from transmitting all the time, it is arranged to respond to an interrogating signal transmitted by the interrogator 4. For this purpose, the interrogator 4 has a transmitter 6 controlled by a controller 8.

Responsive to the interrogate signal, the transponder returns a signal modulated by data. The data may merely be a code identifying the particular tag, or may include other data, for example collected from one or more sensors, not shown. The signal returned by the transponder is received by the receiver 10 which is also controlled by the controller 8.

In order to synchronize the transponder 2 and the receiver 10, the interrogating signal is periodically modulated by clocking information in the form of a first periodic reference clock signal CLK1 provided by the controller 8. Clocking information is also provided by the controller 8 to the receiver 10 in a second periodic reference signal CLK2.

The transponder uses the clocking information in the interrogating signal to transmit data patterns stored in RAM to form a phase modulated sub-carrier. This signal is received by the receiver 10, synchronously demodulated using clocking information in the form of the second periodic reference signal CLK2 from the controller, then integrated and passed to the controller. The controller then processes the data to identify a unique start code and hence the data. If the data passes a 16 bit error checking algorithm, the data is sent on a serial link 12 to a host computer, not shown.

The periodically modulated interrogating signal is demodulated in the transponder to recover the baseband periodic clock signal. In order to keep the clock recovery stage of the transponder simple, the interrogating signal has a periodic envelope. The easiest form of modulation to use is to turn a radio frequency carrier on and off at the clock rate. If the carrier were turned on and off at a typical clock rate of say 200 kHz, this form of modulation would result in an extremely wide bandwidth which would cause interference with adjacent radio channels.

One way to reduce the bandwidth would be to use linear amplitude modulation. The clock signal in the form of a sinewave would modulate the carrier at less than 100% modulation. Unfortunately, this would make the transponder complicated in order to cope with the varying signal levels.

Figure 2:
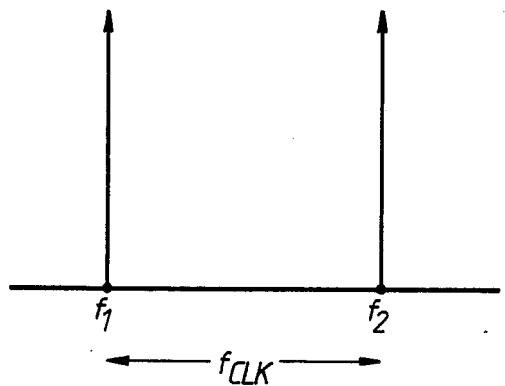
FIG. 2 shows the frequency spectrum of a dual carrier interrogating signal.

In order to retain a narrow bandwidth interrogating signal and a simple clock recovery circuit in the transponder, the transmitter 6 produces a signal comprising the sum of two sinusoids. In effect, the signal has dual carriers at frequencies $f_1$ and $f_2$ shown in FIG. 2. The carriers are unmodulated, so that the entire frequency spectrum of the interrogating signal consists of the two frequencies illustrated in FIG. 2.

Figure 3:
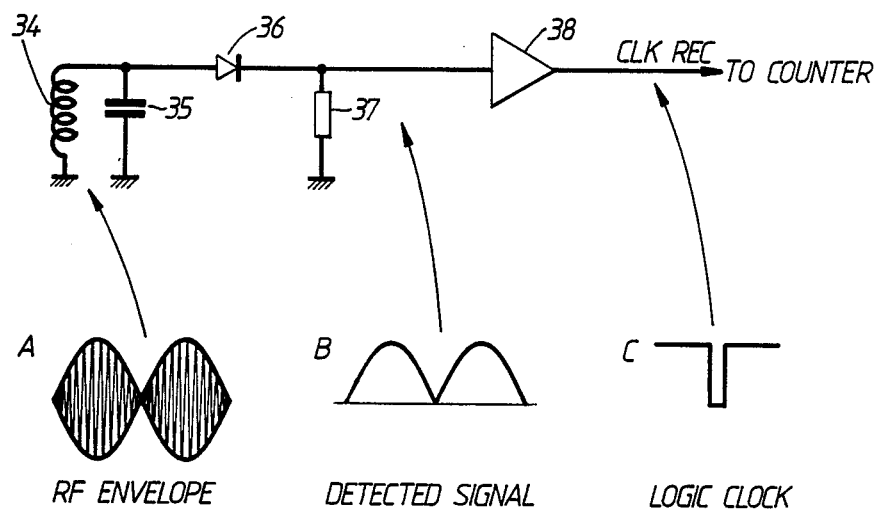
FIG. 3 shows a general circuit for the transponder of FIG. 1 to demodulate the interrogate signal to recover the clocking information, together with associated signal forms.

As is known, the sum of two sinusoids produces a beat or modulation of the periodic envelope of the signal as illustrated at A in FIG. 3. The beat frequency is $$f_2 - f_1.$$

The controller 8 therefore controls the transmitter 6 to produce a signal in which the difference between the two frequencies represents the required clocking information to the transponder. The beat frequency can be multiplied or divided as desired in the transponder.

Figure 4:
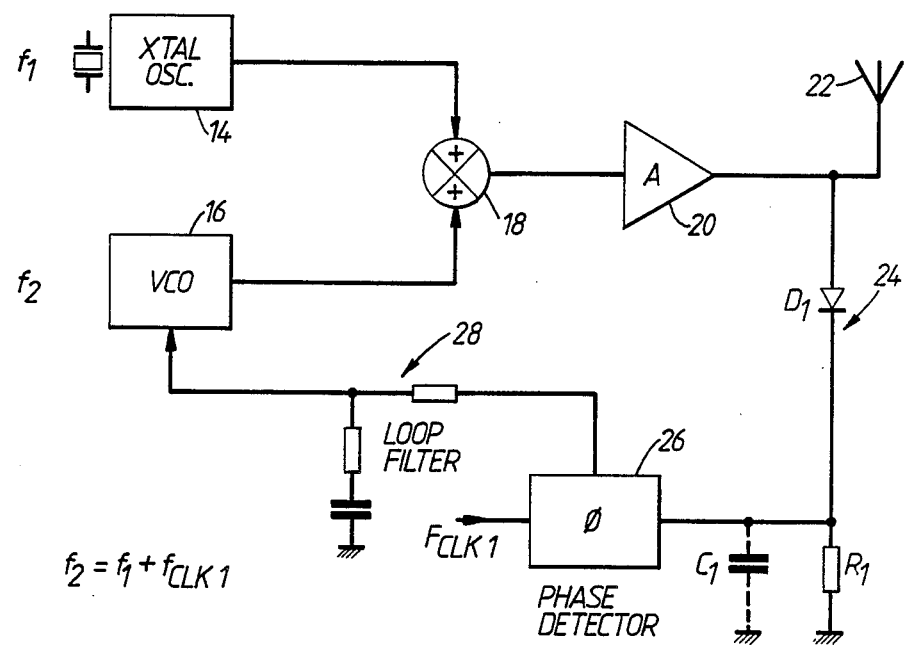
FIG. 4 shows a phase locked loop transmitter circuit for the interrogator of FIG. 1, for transmitting a dual carrier interrogate signal.

One suitable circuit for the transmitter 6, is illustrated in FIG. 4. Carrier frequency $f_1$ is produced by a stable crystal controlled oscillator 14. The other carrier frequency $f_2$ is produced by a voltage controlled oscillator 16. The outputs of the two oscillators are summed in mixer 18 amplified by power amplifier 20 and transmitted by antenna 22.

The output of the amplifier 20 is also fed to an envelope detector 24 comprising a diode $D_1$ a resistor $R_1$. A signal taken at the junction between the resistor $R_1$ and the diode $D_1$, is input to a phase detector 26 and is smoothed either by capacitor $C_1$ which may be parasitic or merely by the phase detector having a slow response. The effective input to the phase detector 26 is therefore a baseband signal corresponding to the envelope shape of the transmitted signal, i.e. a signal of fundamental frequency $$f_2 - f_1.$$

The other input to the phase detector 26 is the first periodic reference signal in the form of a clock signal CLK1 of frequency $F_{clk1}$ from the controller 8. The phase detector produces an output indicative of difference in phase between the two inputs. The output is filtered by filter network 28 and used to control the frequency of the voltage controlled oscillator 16, in a sense to reduce any detected phase error, so that the phase and frequency of the periodic envelope are determined by the phase and frequency of the first periodic reference signal CLK1.

Figure 5:
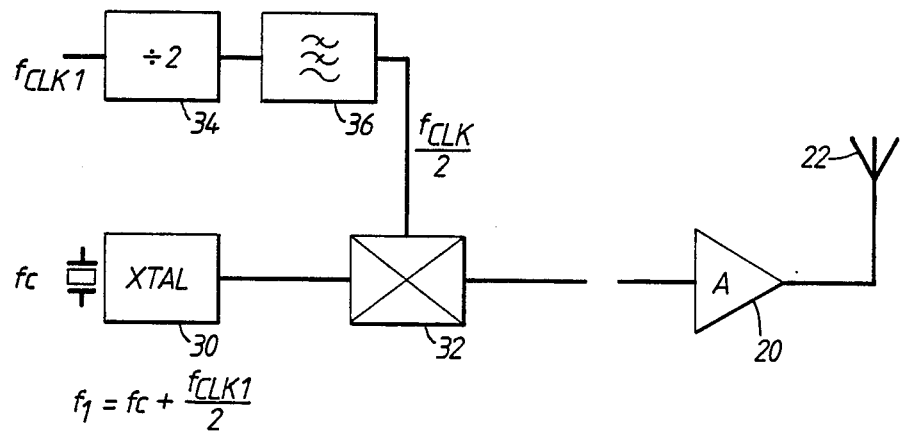
FIG. 5 shows a double sideband transmitter circuit for the interrogator of FIG. 1, for transmitting a dual frequency carrier interrogate signal.

An alternative circuit for the transmitter 6 is illustrated in FIG. 5. A crystal controlled oscillator 30 is tuned to the centre frequency $$f_c = \frac{f_2 + f_1}{2}$$

The output of the oscillator 30 provides the carrier input to a balanced modulator 32.

The clock signal frequency $F_{clk1}$ from the controller 8, is divided by two in divider 34 and filtered by low pass filter 36 to provide the modulating input to the modulator 32. The modulator is operative to produce an amplitude modulated signal in which the carrier is suppressed by at least 40 dB. The modulator thus produces a signal containing essentially only the sidebands $$f_c \pm (F_{clk1}/2 = f_1 + f_2$$

The modulator output is amplified by power amplifier 20 and transmitted by antenna 22.

The signal transmitted by the interrogator is received by a clock recovery input stage of the transponder, illustrated in general form in FIG. 3. The signal is received by an antenna 34 tuned to the centre frequency $f_c$ by a capacitor 35. The envelope of the radio frequency signal, as received, is illustrated at A. As can be seen the amplitude of the radio frequency signal is periodically modulated, the envelope having the same period as CLK1. The radio frequency signal is demodulated by a detector circuit comprising a half wave rectifying arrangement of diode 36 and a resistor 37. The input of an amplifier 38 is connected to receive the rectified signal. The amplifier is too slow to respond to the radio frequency remaining in the half wave rectified signal, so that the effective input signal is the baseband signal illustrated at B, corresponding to the envelope of the rectified radio frequency signal.

The amplifier 38 has a high gain and reshapes the signal B, to produce a recovered clock signal $CLK_{rec}$ containing a pulse illustrated at C, for each time the baseband signal B crosses a threshold determined by the schmitt trigger circuit. Since the signal B essentially falls to zero once per cycle, complicated level compensating arrangements are unnecessary. No automatic gain control, for example, is necessary to compensate for different levels of received radio frequency signal. Different levels of received signal do, however, result in different pulse widths. Since the transponder circuits respond to the edge of the clocking signal pulses, the only effect this has is to introduce timing variations in the transponder's output. The way this is dealt with is explained later.

Figure 6A:
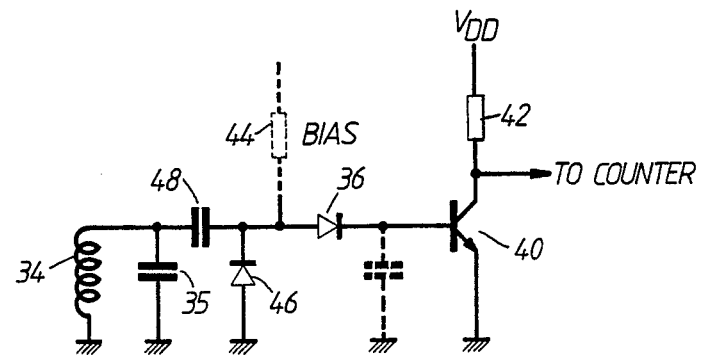
FIGS. 6A and 6B show alternative bipolar and CMOS demodulator circuits for the transponder of FIG. 1, in more detail than FIG. 3.

FIG. 6A shows details of a bipolar example of the general circuit of FIG. 3. The amplifier is provided in the form of a transistor 40 having a collector resistor 42. A resistor 44 may be provided to bias the base of the transistor 40. The tuned antenna and capacitor circuit 34, 35 is coupled to a rectifying arrangement of diodes 36 and 46, by a capacitor 48.

Figure 6B:
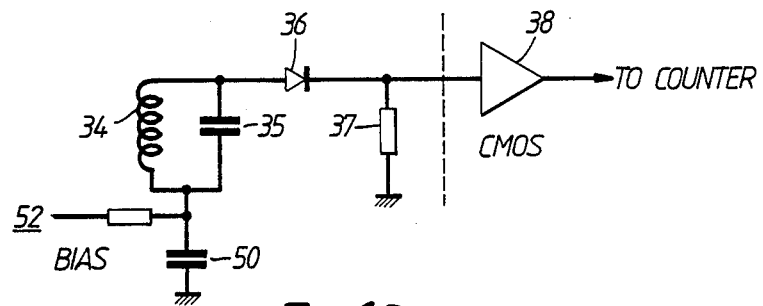

FIG. 6B shows a CMOS example of the general circuit of FIG. 3. The amplifier 38 in FIG. 6B is implemented in CMOS. A bias for the amplifier is provided by resistor 52. A capacitor 50 prevents a standing current to ground, so reducing the quiescent current of the circuit.

Figure 8:
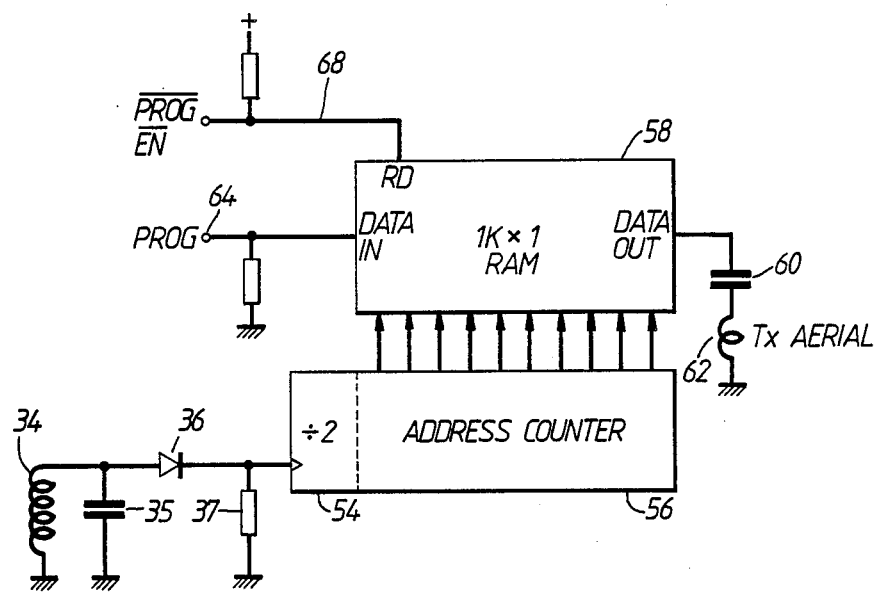
FIG. 8 shows a general circuit of the complete transponder of FIG. 1.

The general circuit of the complete transponder is illustrated in FIG. 8. The clock recovery circuit 34, 35, 36, 37 supplies the recovered clock signal to a divide by two circuit driving an address counter circuit 56. Parallel outputs from the address counter 56 provide address inputs to a 1K by 1 bit wide random access memory (RAM) 58. The bit data output lead from the memory, is connected direct to a capacitor 60 and aerial 62, tuned to the carrier frequency to be transmitted.

The circuits 54, 56 and 58 are preferably CMOS integrated circuits. The power is provided by a miniature dry cell which clearly stores only a limited amount of energy. The advantage of using CMOS circuits is that very little power is used when the circuits are not being clocked. The quiescent current may be less than one micro amp, for example. Because the interrogating signal is used to supply the clock, when the transponder is out of the interrogator's transmitter field, it is effectively powered down.

Figure 7:
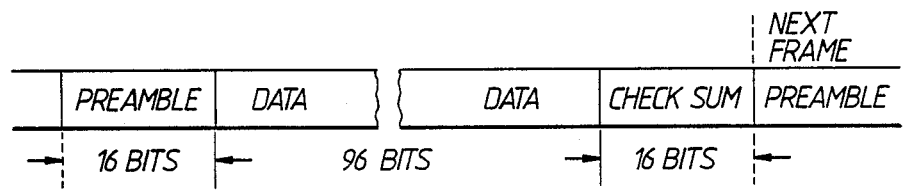
FIG. 7 shows the structure of a block of data.

The structure of the data stored in the RAM is illustrated in FIG. 7. A frame or block of data starts with a 16 bit preamble or start code. This is a unique pattern which is deliberately chosen so as not to occur anywhere else in the data. The preamble is used by the interrogator to identify the beginning of the data block.

Next in the frame or block there is code representing the identity of the particular transponder and/or whatever other information it is desired to provide.

Finally in the block there is a 16 bit check sum taken over the block. This is used by the interrogator to check that the data has been received without errors.

The data is stored in the RAM in the format of a modulated signal, so that both the carrier frequency and the data rate are determined by the rate at which the data pattern is read out of the RAM.

Figure 9:
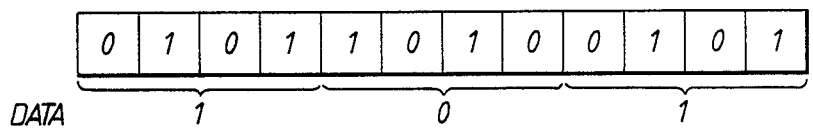
FIG. 9 shows a form in which data is stored in the transponder.

A format for phase shift keying modulation, is indicated in FIG. 9. In the drawing, a data state of ONE is stored in the RAM as a pattern 0101. A data state of ZERO is stored in the RAM as 1010. The data is therefore in a form which can be directly transmitted and the data bit output of the RAM is connected directly to the tuned capacitor/aerial 60, 62. The address counter 56 steps through successive addresses, controlled by the divided-by-two clock signal, and successive memory locations are read direct to the aerial resulting in the transmission of a phase shift keying signal. The transmitted signal is received by the interrogator and can be then demodulated as a phase shift keying signal to recover the pattern of data states ONE and ZERO.

Data in the format of a modulated signal can be written into the RAM via a program lead 64 under control of an input on a program enable lead 68.

The form of the data provides a degree of freedom in choosing data rates and a carrier frequency for the signal to be transmitted by the transponder. If data state ONE were represented by 01 and data state ZERO by 10, for example, the data rate would be twice as high (and thus more susceptible to errors) but the carrier frequency would remain the same as that for the data form illustrated in FIG. 9. If however, data state ONE were represented by 0011 and data state ZERO by 1100, the data rate would be the same but the carrier frequency would be a half that arising from the format illustrated in FIG. 9.

The phase shift keying signal transmitted by the transponder 2 is received by the receiver 10 which has a circuit illustrated in FIG. 10. The signal is picked up by an aerial 70, filtered by a bandpass filter 72 and amplified by amplifier 74. The amplified signal is limited by limiter 76. The limited signal provides one input to a synchronous demodulator in the form of an exclusive-OR gate 78. The other input to the exclusive-OR gate is the second periodic reference signal in the form of a clock signal CLK2 provided by the controller 8. The exclusive-OR gate is responsive to the phase of the clock signal CLK2 in that the received phase shift keying signal reshaped by the limiter 76, and the clock signal are, essentially, either in phase or in anti-phase depending on whether the phase of the received signal represents a data state ONE or ZERO. If the signals are in phase the output from the exclusive-OR circuit 78 is high, essentially continuously representing a data state of ONE. Conversely, if the signals are in anti-phase, the output from the exclusive-OR circuit is low, essentially continuously, representing a data state of ZERO. The output of the exclusive-OR circuit 78 is integrated by integrator circuit 80 and reshaped by Schmitt trigger circuit 82, in order to remove any small spikes caused by small timing differences between the input signals to the exclusive-OR circuit 78. The time constant of the integrator should be of the same order as the length of a data bit.

The clock pulses arrive at the exclusive-OR circuit 78 at the right rate to demodulate the received phase shift keying signal, because the clock signal is provided by the controller 8 which also transmits clock signals to control the transponder 2, as explained above.

Although the data is received at the right rate, it is not necessarily in the right phase relative to the clock signal input to the exclusive-OR circuit 78. For example, depending on when the transponder starts to transmit data, it is possible for the phase shift keying format signal 0101 (representing the data state ONE) to arrive at the exclusive-OR circuit 78 with the clock pulse sequence 1010. That would result in the phase shift keying signal being demodulated erroneously as data state ZERO.

This problem is rectified in the controller 8 which is illustrated in more detail in FIG. 11. The demodulated data output of the receiver 10 is shifted into an 8 bit shift register 84 under control of clock signals produced by dividing the clock signal to the transmitter by 8, in a divide by 8 circuit 86. The clock rate needs to be divided by 8 because the clock rate is divided by 2 in the transponder (divider 54) and the phase shift keying type of modulation requires 4 divided-clock-pulses for each data state. That is each bit of data e.g. data state ONE requires 4 memory locations in the transponder, and thus 4 divided-clock pulses are required to read the bit out to the aerial.

The clock signal is divided by 8 again by divider 88 to produce a read input to a micro computer 90. When the shift register has received 8 bits of data the circuit 88 produces a pulse to cause the microcomputer to read the eight bits of data from the shift register in parallel on a data bus 92.

The microcomputer 90 contains a program in read only memory (ROM) which stores successive 8 bit data words in different locations in internal random access memory. When the memory contains a block of data equivalent to the length of a complete data block (FIG. 7), in the present embodiment 128 bits, the program searches through the data stored in the memory to identify the start code or preamble. The search may be achieved by shifting the data past a 16 bit window and comparing the bits in the window after each shift, with the expected start code. If the search is successful, the program is able to identify the relative positions of the code representing the identity of the transponder and/or whatever other information has been transmitted, and of the check sum. The program calculates a check sum for the data received and if this corresponds with the check sum received, indicates to the host computer that it has data ready for transmission.

Meanwhile, the interrogating signal is still being transmitted to the transponder, the transponder is repetitively transmitting the block of data to the receiver, and the receiver is demodulating the received signal. If the check sums do not correspond, the microcomputer 90 reads in another block of data and repeats the process.

If the start code cannot be found it is likely that the signal transmitted by the transponder is not in phase with the clock signal provided to the exclusive-OR circuit 78 (FIG. 10), or that the clock signal CLK2 which shifts the demodulated signal into the register 84, is timed badly relative to the recovered data pulses. This problem is overcome by shifting the phase of one periodic reference signal relative to the other. In the present embodiment this is achieved by pulse skipping. The microcomputer provides an output to a gate 92 which deletes one clock pulse from the signal provided to the transmitter 6. Thus there is a phase shift between the modulated signal transmitted by the transponder on the one hand, and the clock pulses provided to the divider 86 in the controller and the exclusive-OR circuit 78 in the receiver on the other hand. The microcomputer reads a block of data from the receiver and again searches for the start code. This process is repeated until the start code is found when the check sum comparison is again made and the host computer informed if the check sums agree.

The divide by two circuit 54 in the transponder (FIG. 8) increases the resolution achieved by the pulse skipping, by a factor of two. This improves the system's ability to compensate for timing differences in the signal received from the transponder. Timing differences may have several causes: e.g. the transponder memory may have slow access, the variable pulse width of the clock signal recovered in the transponder causes variations in the position of the pulse edge which clocks the address counter, tuned circuits and filters introduce phase shifts and thus timing differences.

Instead of skipping a pulse in the clock signal to the transmitter, a pulse could be skipped in the clock signal to the receiver. Alternatively, a pulse could be stuffed in the clock signal to either the transmitter or the receiver.

I claim:

1. A transponder, comprising:
   means for receiving an interrogating signal having a periodic envelope sent from an interrogating means, including a transmitter and a receiver;
   means for demodulating the received signal to produce a periodic baseband signal; and
   means for transmitting data serially and direct, without modulating a carrier from said transponder to said interrogating means at a rate determined by the periodicity of the baseband signal and means for reading out of memory a representation of a carrier modulated by said data, the carrier having a frequency also determined by the periodicity of the baseband signal.

2. A transponder as claimed in claim 1, wherein the interrogating signal has a periodic envelope, and wherein the means for demodulating comprises means for detecting the envelope of the received signal to produce the periodic baseband signal.

3. A transponder as claimed in claim 2, wherein:
   the means for detecting comprises means for half wave rectifying the received signal.

4. A transponder as claimed in claim 1, including:
   means for storing said data.

5. Apparatus for interrogating a transponder as claimed in claim 1, comprising:
   a periodic reference signal;
   means responsive to said periodic reference signal, for transmitting a periodically modulated said modulation being determined by the periodicity of interrogating signal, the periodicity of said reference signal; and
   means for receiving a signal transmitted by the transponder having a carrier frequency and data rate determined by said reference signal as a result of the interrogating signal, to recover the data.

6. Apparatus as claimed in claim 5, wherein the interrogating signal has a periodic envelope.

7. Apparatus as claimed in claim 6, wherein the means for transmitting an interrogating signal comprises:
   means for generating a signal comprising the sum of two sinusoids having frequencies differing by an amount determined by the periodicity of said reference signal.

8. Apparatus as claimed in claim 7, wherein the means for generating comprises:
   a fixed frequency oscillator;
   a variable frequency oscillator;
   means for summing the outputs of the oscillators;

means for detecting the amplitude variations in the summed outputs to produce a baseband signal; and a phase detector for detecting differences in phase between the baseband signal and said reference signal, to control the frequency of the variable frequency oscillator to reduce such phase differences.

9. Apparatus as claimed in claim 7, wherein the means for transmitting comprises:

an oscillator and a balanced modulator arranged to modulate the oscillator output with a modulating signal input from said reference signal, so as to produce an output signal having two frequency components differing by twice the frequency of the modulating signal input.

10. A transponder as claimed in claim 2, wherein the means for transmitting data comprises:

memory means for providing a carrier modulated by said data, the carrier having a frequency also determined by the periodicity of the baseband signal.

11. A transponder as claimed in claim 3, wherein the means for transmitting data comprises:

memory means for providing a carrier modulated by said data, the carrier having a frequency also determined by the periodicity of the baseband signal.

12. A transponder as claimed in claim 2, including: means for storing said data.

13. A transponder as claimed in claim 3, including: means for storing data.

14. A transponder as claimed in claim 1, including: means for storing said data.

15. Apparatus for interrogating a transponder as claimed in claim 2, comprising:

means responsive to a periodic reference signal, for transmitting a periodically modulated interrogating signal, the periodicity of said modulation being determined by the periodicity of the reference signal; and means for receiving a signal transmitted by the transponder as a result of the interrogating signal, to recover the data.

16. Apparatus for interrogating a transponder as claimed in claim 3, comprising:

means responsive to a periodic reference signal, for transmitting a periodically modulated interrogating signal, the periodicity of said modulation being determined by the periodicity of the reference signal; and means for receiving a signal transmitted by the transponder as a result of the interrogating signal, to recover the data.

17. Apparatus for interrogating a transponder as claimed in claim 1, comprising:

means responsive to a periodic reference signal, for transmitting a periodically modulated interrogating signal, the periodicity of said modulation being determined by the periodicity of the reference signal; and means for receiving a signal transmitted by the transponder as a result of the interrogating signal, to recover the data.

18. Apparatus for interrogating a transponder as claimed in claim 4, comprising:

means responsive to a periodic reference signal, for transmitting a periodically modulated interrogating signal, the periodicity of said modulation being determined by the periodicity of the reference signal; and means for receiving a signal transmitted by the transponder as a result of the interrogating signal, to recover the data.

19. A transponder comprising:

means for receiving an interrogating signal having a periodic envelope and for producing a received signal output representative thereof;

clock means responsive to said received signal output to generate a clock signal representative of the periodicity thereof;

means for storing data in the form of a digital representation of a modulated signal and responsive to the clock signal to read the data; and means for transmitting said read data serially and direct, without modulating a carrier.

20. A transponder as claimed in claim 19 wherein: the means for storing, contains data in the format of a phase shift keying signal, data state ONE being represented by an alternating pattern of ONEs and ZEROs in the means for storing, and data state ZERO being represented by the inverse pattern.

21. A transponder as claimed in claim 19 wherein: the data output of the means for storing is connected via a voltage stable capacitor direct to an antenna.

22. A transponder as claimed in claim 20 wherein: the data output of the means for storing is connected via a voltage stable capacitor direct to an antenna.

23. A transponder as claimed in claim 20 wherein: the data output of the means for storing is connected via a voltage stable capacitor direct to an antenna.

* * * * *

UNITED STATES PATENT AND TRADEMARK OFFICE
CERTIFICATE OF CORRECTION

PATENT NO. : 4,931,788
DATED : June 5, 1990
INVENTOR(S) : Martin Creswick

It is certified that error appears in the above-identified patent and that said Letters Patent is hereby corrected as shown below:

Column 4, line 13:
    After "disadvantage" insert -- . --
Column 6, line 52:
    After "$F_{clk1}$" insert -- ) --
Col. 10, line 48:
    After "modulated" insert -- interrogating signal, the periodicity of --

After "periodicity of" delete -- interrogating signal, the periodicity of -- periodicity --
Col. 11, line 30:
    After "storing" insert -- said --

Signed and Sealed this

Twenty-eighth Day of January, 1992

*Attest:*

HARRY F. MANBECK, JR.

*Attesting Officer*      *Commissioner of Patents and Trademarks*